United States Patent
Lee et al.

(10) Patent No.: US 6,798,621 B2
(45) Date of Patent: Sep. 28, 2004

(54) SHIELD ELECTRICAL CONNECTIONS FOR TUNNEL VALVE SENSORS

(75) Inventors: Edward Hin Pong Lee, San Jose, CA (US); Jeffrey Gregory McCord, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 10/219,727

(22) Filed: Aug. 15, 2002

(65) Prior Publication Data

US 2004/0032697 A1 Feb. 19, 2004

(51) Int. Cl.[7] .................................................. G11B 5/39
(52) U.S. Cl. ........................................................ 360/322
(58) Field of Search ................................. 360/317, 319, 360/322, 324.2

(56) References Cited

U.S. PATENT DOCUMENTS

| | | | |
|---|---|---|---|
| 5,898,548 A | 4/1999 | Dill et al. | |
| 6,134,089 A | * 10/2000 | Barr et al. | ................... 360/322 |
| 6,219,212 B1 | 4/2001 | Gill et al. | |
| 6,400,537 B2 | * 6/2002 | Sakakima et al. | ........ 360/324.2 |

\* cited by examiner

Primary Examiner—A. J. Heinz
(74) Attorney, Agent, or Firm—John J. Oskorep, Esq.

(57) ABSTRACT

A magnetic head includes a tunnel valve sensor, a first shield coupled to a first end of the tunnel valve sensor, and a second shield coupled to a second end of the tunnel valve sensor. A first connecting column electrically couples the first shield to a first read pad, and a second connecting column electrically couples the second shield to a second read pad. However, the first connecting column is magnetically uncoupled from the first shield and the second connecting column is magnetically uncoupled from the second shield. Advantageously, this eliminates or substantially reduces the influence of the connecting columns (which may be made in part from the same magnetic materials as the pole pieces) on the magnetic properties of the shields. In one example, the first connecting column is offset from the first shield and is coupled to it through a first connecting neck, and similarly the second connecting column is offset from the second shield and is coupled to it through a second connecting neck. In another example, the first and the second shields are made of a magnetic material whereas the first and the second connecting columns are made of a non-magnetic electrically conductive material.

25 Claims, 7 Drawing Sheets

-- PRIOR ART --
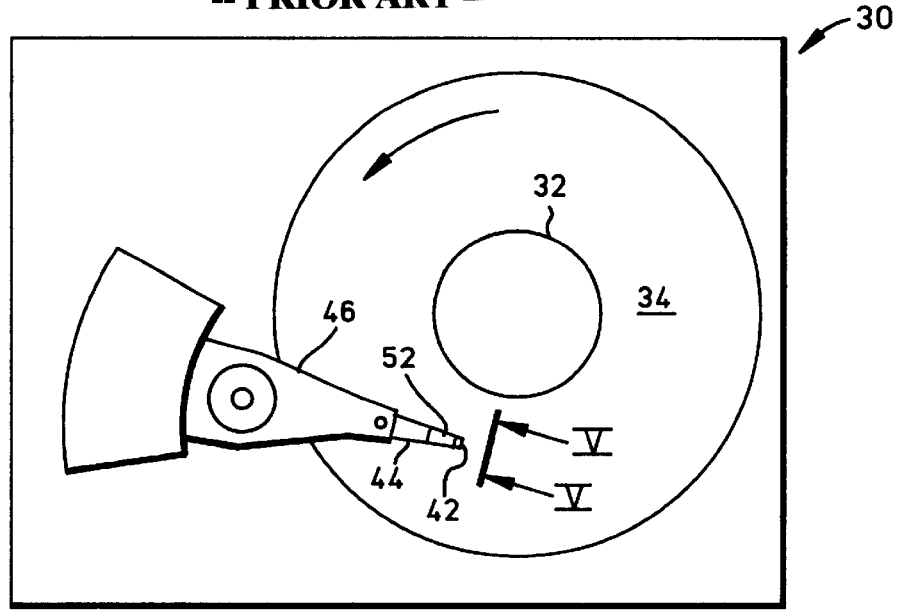
FIG. 4
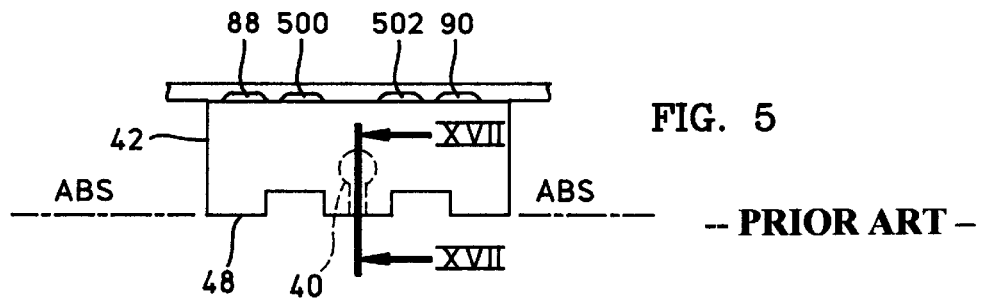
FIG. 5      -- PRIOR ART --
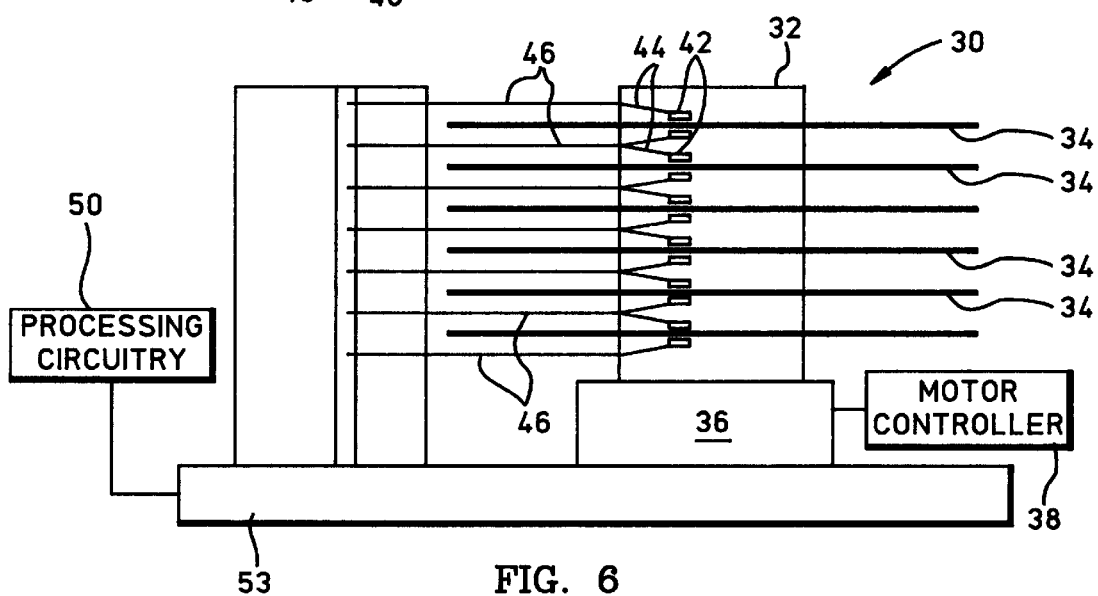
FIG. 6      -- PRIOR ART --

-- PRIOR ART --

-- PRIOR ART --

SHIELD ELECTRICAL CONNECTIONS FOR TUNNEL VALVE SENSORS

BACKGROUND OF THE INVENTION

1. Field of the Invention

This invention relates generally to shield connections for tunnel valve sensors, and more particularly to shield connections formed by connecting columns that are magnetically uncoupled from the shields.

2. Description of the Related Art

Computers often include auxiliary memory storage devices having media on which data can be written and from which data can be read for later use. A direct access storage device (e.g. a disk drive) incorporating rotating magnetic disks is commonly used for storing data in magnetic form on the disk surfaces. Data is recorded on concentric, radially-spaced tracks on the disk surfaces. Magnetic heads including read sensors are then used to read data from the tracks on the disk surfaces.

In high capacity disk drives, magnetoresistive (MR) read sensors, commonly referred to as MR sensors, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer. The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. Sensors using only two layers of ferromagnetic material (e.g., NiFe) separated by a layer of non-magnetic material (e.g., copper) are generally referred to as spin valve (SV) sensors manifesting the SV effect.

Another type of magnetic device is a magnetic tunnel junction (MTJ) device or "tunnel valve sensor". The MTJ device has potential applications as a memory cell and as a magnetic field sensor. The MTJ device comprises two ferromagnetic layers separated by a thin, electrically insulating, tunnel barrier layer. The tunnel barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetic moments, or magnetization directions, of the two ferromagnetic layers. In the MTJ sensor, one ferromagnetic layer has its magnetic moment fixed, or pinned, and the other ferromagnetic layer has its magnetic moment free to rotate in response to an external magnetic field from the recording medium (the signal field). When an electric potential is applied between the two ferromagnetic layers, the sensor resistance is a function of the tunneling current across the insulating layer between the ferromagnetic layers. Since the tunneling current that flows perpendicularly through the tunnel barrier layer depends on the relative magnetization directions of the two ferromagnetic layers, recorded data can be read from a magnetic medium because the signal field causes a change of direction of magnetization of the free layer, which in turn causes a change in resistance of the MTJ sensor and a change in the sensed current or voltage. IBM's U.S. Pat. No. 5,650,958 granted to Gallagher et al., incorporated in its entirety herein by reference, discloses an MTJ sensor operating on the basis of the magnetic tunnel junction effect.

The electrical sense current to the MTJ sensor is preferably applied by means of electrical conductors in the form of thin metal layers located above and below the MTJ sensor. More particularly, the magnetoresistive read elements are typically placed between two thick and highly permeable magnetic layers or "shields". The shields may be connected to read signal processing circuitry through what are referred to as "connecting columns" made of a magnetic material. Unfortunately, such connecting columns for the shields may undesirably influence the magnetic properties of the shields, which may result in magnetic instability for the shields.

To further illustrate, FIG. 1 shows a top down view of a partially constructed magnetic head 100. In FIG. 2, a cross-sectional view along lines II—II of FIG. 1 of this magnetic head is shown, and in FIG. 3 a more completed magnetic head is shown in cross-section. Magnetic head 100 includes a first shield 102 and a second shield 104, both made of a magnetic material. A tunnel valve sensor 106 is sandwiched in between and coupled to these first and second shields 102 and 104.

A first connecting pedestal 110 helps provide a first connection for sensor 106 from first shield 102, whereas a second connecting pedestal 112 helps provide a second connection for sensor 106 from second shield 104. First and second connecting pedestals 110 and 112 are made of a magnetic material. Also, first connecting pedestal 110 is formed over first shield 102 along its back edge and, similarly, second connecting pedestal 112 is formed over second shield 104 along its back edge. Connecting pedestals 110 and 112 are extended upwards to form connecting columns. These connecting columns are coupled to read pads on the surface of the slider; leads are wire-bonded to these read pads and coupled to read signal processing circuitry of the disk drive. Remaining conventional elements of the magnetic head in FIG. 3 include a first pole piece (P1) layer 108, a P1 pedestal 306, a P1 back gap pedestal 318, a second pole piece (P2) which includes a P2 pole 310 and a P2 back gap 316, a gap layer 310 which separates the first and the second pole pieces at the ABS, a connecting yoke 312, and write coils 314. First pole piece layer 108, P1 pedestal 306, P1 back gap pedestal 318, P2 pole 310, P2 back gap 316, and connecting yoke 312 are made of magnetic materials, whereas gap layer 310 is made of an insulator.

The basic problem is that the connecting columns may adversely affect the magnetic behavior of the shields. This is due to stress contributions. It may be desirable that at least portions of the connecting columns be made from a magnetic material that is different from the magnetic material of the shields. For example, it may be desirable to make the upper layers of the connecting columns from the same magnetic material as the pole pieces. The use of additional connecting layers results in an even stronger influence on the magnetic properties of the shield, which may undesirably lead to magnetic instabilities in the shield.

Accordingly, what are needed are improved shield connections for tunnel valve sensors in magnetic heads and methods of making the same.

SUMMARY OF THE INVENTION

The present invention relates to a magnetic head which includes a tunnel valve sensor, a first shield coupled to a first end of the tunnel valve sensor, and a second shield coupled to a second end of the tunnel valve sensor. A first connecting column of the magnetic head electrically couples the first shield to a first read pad, and a second connecting column of the magnetic head electrically couples the second shield to a second read pad. The first connecting column is magnetically uncoupled from the first shield and the second connecting column is magnetically uncoupled from the second shield. Advantageously, this eliminates or substantially reduces the influence of the connecting columns on the magnetic properties of the shields.

In one embodiment of the invention, the first connecting column is offset from the first shield and is coupled to it through a first connecting neck. Similarly, the second connecting column is offset from the second shield and is coupled to it through a second connecting neck. Preferably, the upper layers of the first and second connecting columns are made of the same conductive magnetic material as first and second pole pieces, which reduces the processing steps required in making the magnetic head. In an alternate embodiment of the invention, the first and the second shields are made of a magnetic material whereas the first and the second connecting columns are made of a non-magnetic electrically conductive material (e.g. copper). Here, the first and the second connecting columns may be formed over the shields or be offset from the shields and coupled thereto via connecting necks.

Advantageously, connecting columns which provide electrical connections for the tunnel valve sensor do not influence the magnetic properties of the shields in any significant way, and may be constructed using a simplified process.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 4 is a planar view of a conventional magnetic disk drive;

FIG. 5 is an end view of a slider with a magnetic head of the disk drive as seen in plane V—V of FIG. 4;

FIG. 6 is an elevation view of the disk drive wherein multiple disks and magnetic heads are employed;

DETAILED DESCRIPTION OF THE PREFERRED EMBODIMENTS

Figure 1:
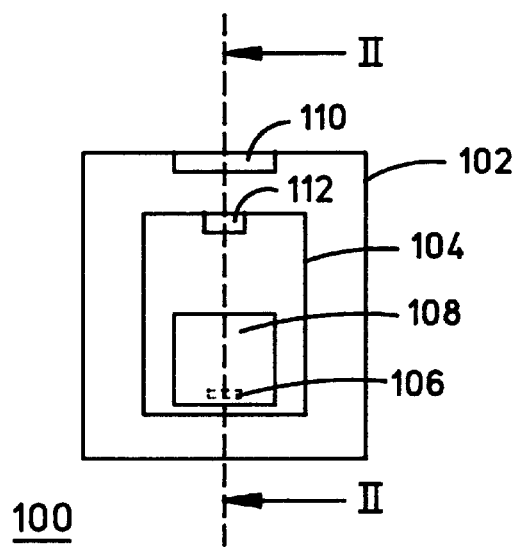
FIG. 1 is a top down view of a partially constructed magnetic head which has shield connections for a tunnel valve sensor.

The following description is the best embodiment presently contemplated for carrying out the present invention. This description is made for the purpose of illustrating the general principles of the present invention and is not meant to limit the inventive concepts claimed herein.

Referring now to the drawings, wherein like reference numerals designate like or similar parts throughout the several views, there is illustrated in FIGS. 4–6 a conventional magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 6. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 μm) cushion of air (air bearing) between the disk and an air bearing surface (ABS) 48.

Figure 7:
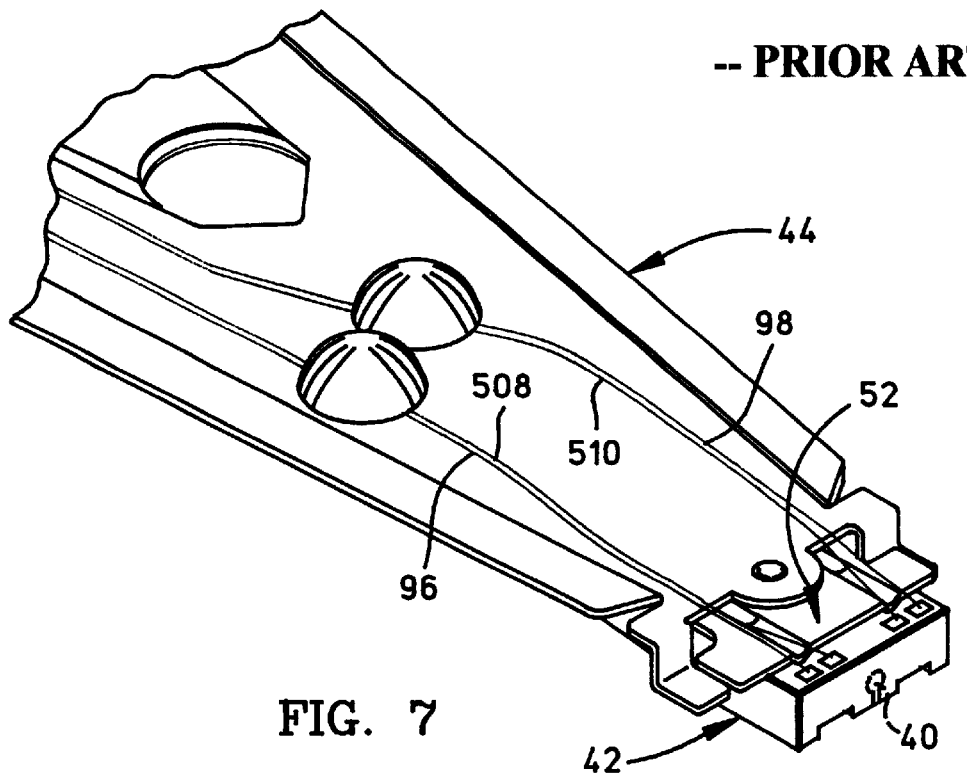
FIG. 7 is an isometric illustration of an exemplary suspension system for supporting the slider and magnetic head of the disk drive.
Figure 8:
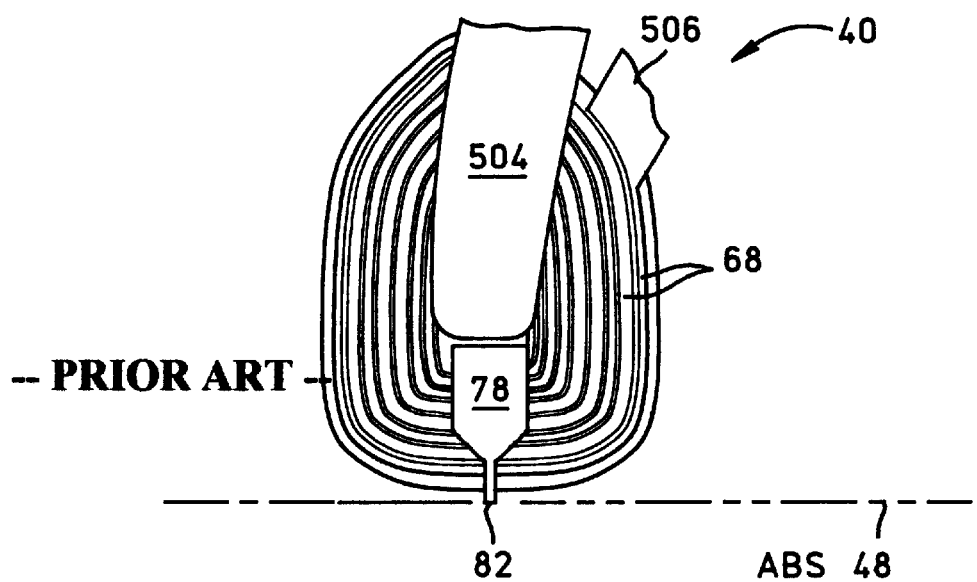
FIG. 8 is a top view of the second pole piece, and a coil layer with all insulation material removed, of the magnetic head of the disk drive.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 4 and 7 the slider 42 is shown mounted to a head gimbal assembly (HGA) 52 that is mounted to the suspension 44. All of the above components are supported on a base 53. As shown in FIGS. 5 and 7, conductive pads 88, 90, 500, and 502 connect leads from a read sensor (not shown) and leads 504 and 506 from a write coil 68 (see FIG. 8) to leads 96, 98, 508, and 510 on the suspension 44.

FIGS. 9–17 are views of partially-constructed magnetic head structures which help describe the shield connections of the present invention. The magnetic head described in relation to FIGS. 9–17 may be employed in the disk drive described in relation to FIGS. 4–8 above. The shield connections may have a unique structure as shown and described later in relation to FIGS. 15–17.

Figure 9:
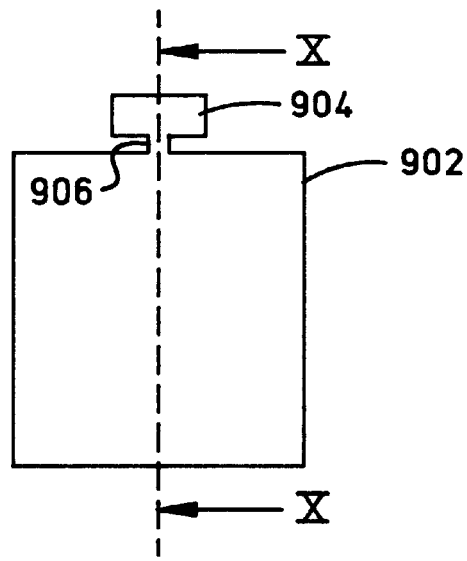
FIG. 9 is the first in a series of nine illustrations of FIGS. 9–17 which describe the formation of the shield connections for a tunnel valve sensor, showing more particularly a top down view of a first shield and a first connecting column layer that is offset from the first shield.
Figure 10:
FIG. 10 is the second in the series of nine illustrations of FIGS. 9–17 which describe the formation of the shield connections for the tunnel valve sensor, showing more particularly a cross-sectional view of that shown in FIG. 9 along line X—X.
Figure 11:
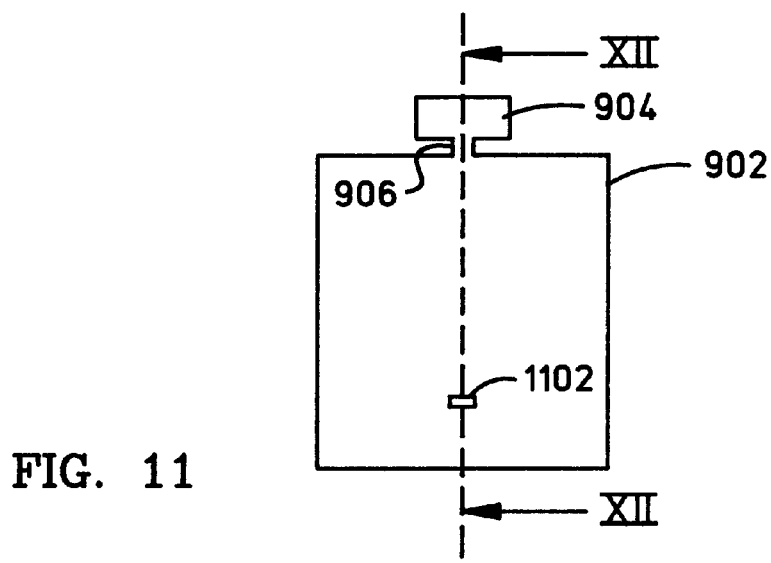
FIG. 11 is the third in the series of nine illustrations of FIGS. 9–17 which describe the formation of the shield connections, which is the same as FIG. 9 except that a tunnel valve sensor is formed over and coupled to the first shield.
Figure 12:
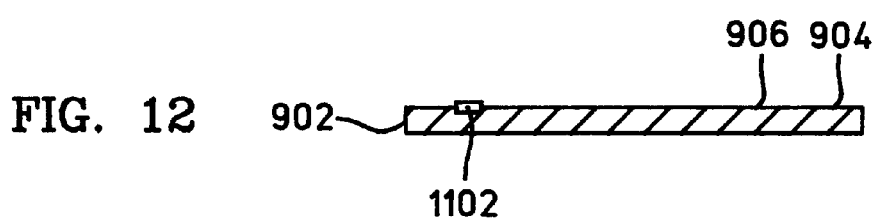
FIG. 12 is the fourth in the series of nine illustrations of FIGS. 9–17 which describe the formation of shield connections, showing more particularly a cross-sectional view of that shown in FIG. 11 along line XII—XII.
Figure 13:
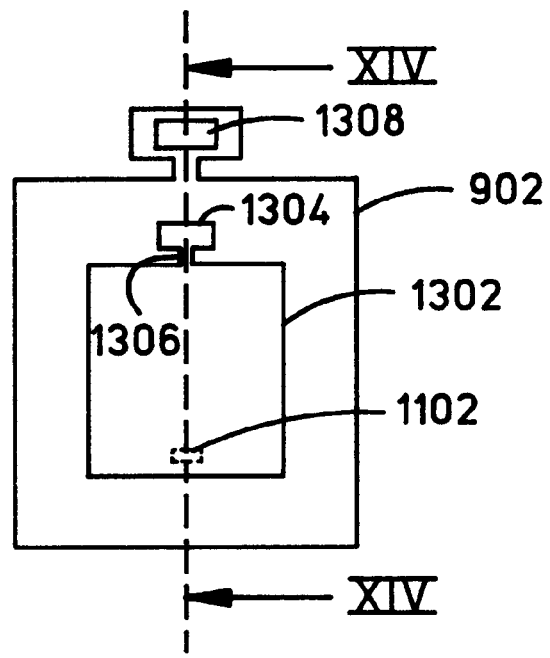
FIG. 13 is the fifth in the series of nine illustrations of FIGS. 9–17 which describe the formation of the shield connections, which is the same as FIG. 11 except that a second shield and a second connecting column layer are formed over the tunnel valve sensor and the first shield.
Figure 14:
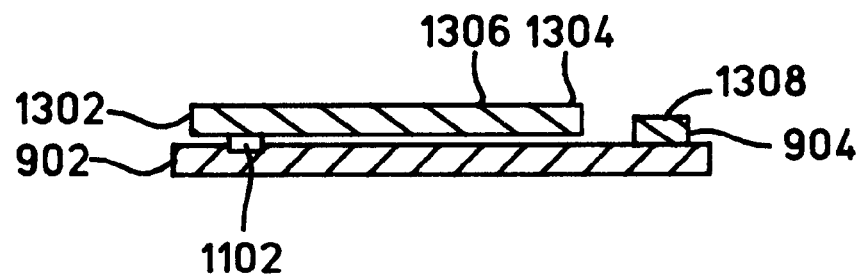
FIG. 14 is the sixth in the series of nine illustrations of FIGS. 9–17 which describe the formation of the shield connections, showing more particularly a cross-sectional view of that shown in FIG. 13 along line XIV—XIV.
Figure 15:
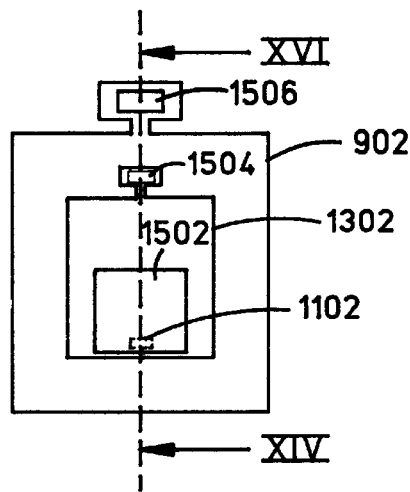
FIG. 15 is the seventh in the series of nine illustrations of FIGS. 9–17 which describe the formation of the shield connections, showing more particularly a first pole piece layer formed over the second shield.
Figure 16:
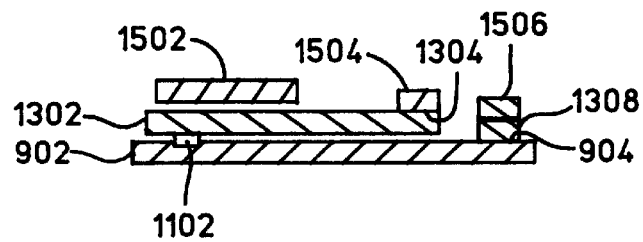
FIG. 16 is a cross-sectional view of that shown in FIG. 15 along line XIV—XIV.
Figure 17:
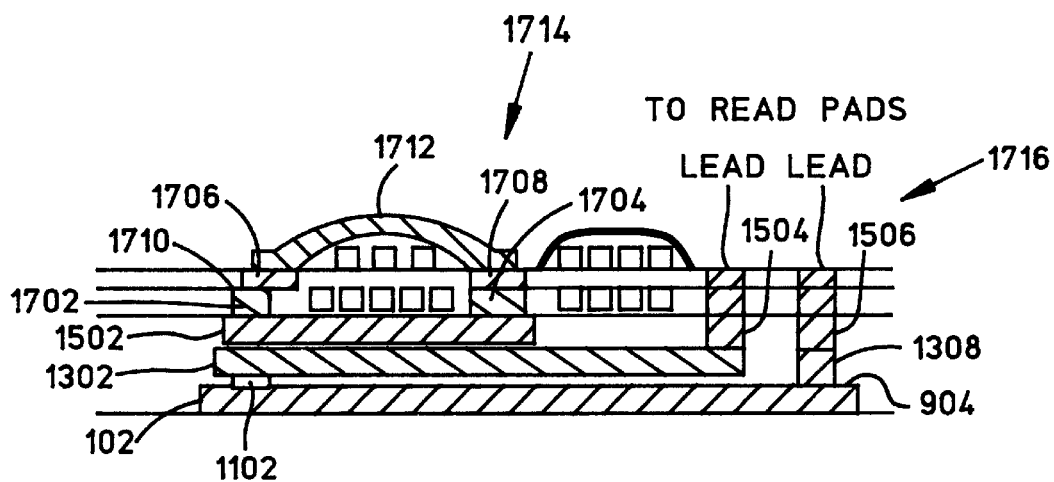
FIG. 17 is a cross-sectional view of a magnetic head which has shield connections in accordance with the present invention.

Referring generally to the figures, a first shield and connecting layer of the 20 magnetic head are shown in FIG. 9 (a top down view) and in FIG. 10 (a cross-sectional view along line X—X of FIG. 9); a tunnel valve sensor formed on this first shield is shown in FIG. 11 (a top down view) and in FIG. 12 (a cross-sectional view along line XII—XII of FIG. 11); a second shield and connecting layer formed over the tunnel valve sensor and the first shield are shown in FIG. 13 (a top down view) and in FIG. 14 (a cross-sectional view along line XIV—XIV of FIG. 13); and a first pole piece layer and additional connecting layers formed over the first and the second shields are shown in FIG. 15 (a top down view) and in FIG. 16 (a cross-sectional view along line XVI—XVI of FIG. 15). FIG. 17 is a cross-sectional view of the magnetic head having additional elements to substantially complete its formation.

In FIGS. 9 and 10, a first shield 902 and a connecting layer 904 for the first shield connection are illustrated. Connecting layer 904 is offset from first shield 902 and is generally separated therefrom, except where it is connected to first shield 902 through a connecting neck layer 906. In general, connecting neck layer 906 has a relatively narrow width and short length. Notation for the width W of connecting neck layer 906 is provided later in relation to FIG. 18. More particularly, connecting neck layer 906 has a width and a surface area that are much smaller than the width and the surface area of first shield 902. Preferably, connecting neck layer 906 has a width that is at least two (2) times less than the width of first shield 902. More particularly, connecting neck layer 906 preferably has a width that is between four (4) and one-hundred (100) times less than the width of first shield 902. In the present embodiment, connecting neck layer 906 is between 1–20 μm in width. First shield 902 and connecting layer 904 may have any suitable thicknesses, such as thicknesses of between about 0.3 and 3.0 μm. In the present embodiment, first shield 902 and connecting layer 904 each have generally rectangular bodies, as shown.

First shield 902, connecting layer 904, and connecting neck layer 906 may be made of or include magnetic materials. Preferably, these magnetic materials are suitable for shielding, and include highly permeable materials which have zero or near-zero magnetostriction. For example, these elements may be made of or include an alloy of $Ni_{81}Fe_{19}$, or more generally NiFe comprised of between 70–90% nickel. Also, first shield 902, connecting layer 904, and connecting neck layer 906 are preferably made from the same magnetic material (e.g. an $Ni_{81}Fe_{19}$ alloy) and are formed simultaneously in the same processing step (e.g. a photolithography step), and generally have the same height as shown in FIG. 10.

In FIGS. 11–12, a tunnel valve sensor 1102 is shown formed on and coupled to first shield 902 using any one of several conventional techniques. In FIGS. 13–14, a second shield 1302 and a connecting layer 1304 for the second shield connection are shown formed over tunnel valve sensor 1102 and first shield 902. Thus, tunnel valve sensor 1102 has a first end coupled to first shield 902 and a second end coupled to second shield 1302. First and second shields 902 and 1302 are oriented generally parallel to each other and are separated by an insulator, such as alumina.

An additional connecting layer 1308 for the first shield connection is shown formed over connecting layer 904 to reach the same or a similar height as second shield 1302. Additional connecting layer 1308 generally has the same dimensions as connecting layer 904 and begins the formation of the connecting column for the first shield connection.

Connecting layer 1304 is structurally similar to connecting layer 904. Connecting layer 1304 is offset from second shield 1302 and is generally separated therefrom, except where it is connected to second shield 1302 through a connecting neck layer 1306. In general, connecting neck layer 1306 has a relatively short length and narrow width. More particularly, connecting neck layer 1306 has a width and a surface area that are much smaller than the width and the surface area of second shield 1302. Preferably, connecting neck layer 1306 has a width that is at least two (2) times less than the width of second shield 1302. More particularly, connecting neck layer 1306 preferably has a width that is between four (4) and one-hundred (100) times less than the width of second shield 1302. In the present embodiment, connecting neck layer 1306 is between 1–20 μm in width. Second shield 1302 and connecting layer 1304 may have any suitable thicknesses, such as thicknesses of between about 0.3 and 3.0 μm. In the present embodiment, second shield 1302 and connecting layer 1304 each have generally rectangular bodies, as shown.

Preferably, second shield 1302, connecting layer 1304, and connecting neck layer 1306 for the second shield connection are made of or include magnetic materials. Preferably, these magnetic materials are suitable for shielding, and include highly permeable materials which have zero or near-zero magnetostriction. For example, these elements may be made of or include an alloy of $Ni_{81}Fe_{19}$, or more generally NiFe comprised of between 70–90% nickel. Also, second shield 1302, connecting layer 1304, and connecting neck layer 1306 are preferably made from the same magnetic material (e.g. an $Ni_{81}Fe_{19}$ alloy) and are formed simultaneously in the same processing step (e.g. a photolithography step), and generally have the same height as shown in FIG. 14.

In FIGS. 15–16, a first pole piece layer 1502 is shown formed over second shield 1302. First pole piece layer 1502 and second shield 1302 are oriented generally parallel to one other and are separated by an insulator, such as alumina. An additional connecting layer 1506 for the first shield connection is shown formed over connecting layer 1308, and an additional connecting layer 1504 for the second shield connection is shown formed over connecting layer 1304 to reach the same or similar height as the first pole piece layer 1502. Additional connecting layer 1506 generally has the same dimensions as connecting layer 1308 to continue the formation of the connecting column for the first shield connection. Also, additional connecting layer 1504 generally has the same dimensions as connecting layer 1304 and begins the formation of the connecting column for the second shield connection.

First pole piece layer 1502, additional connecting layer 1506 for the first shield connection, and additional connecting layer 1504 for the second shield connection are made of or include magnetic materials. Preferably, these magnetic materials are suitable write head materials and include high moment materials. For example, these elements may be made of an alloy of $Ni_{45}Fe_{55}$, or other suitable alloys of NiFe, CoFe, or CoNiFe. First pole piece layer 1502, additional connecting layer 1506, and additional connecting layer 1504 are preferably made from the same magnetic material (e.g. $Ni_{45}Fe_{55}$) and are simultaneously formed in the same processing step (e.g. a photolithography step). Alternatively, additional connecting layers 1504 and 1506 are made from a non-magnetic electrically conductive material (such as copper) where first pole piece layer 1502 is made from the magnetic material. In this case, first pole piece layer 1502 and additional connecting layers 1504 and 1506 are formed in two separate processing steps.

As illustrated in FIG. 17, additional connecting layers complete the formation of the connecting columns which extend upwards from first and second shields 902 and 1302. These connecting columns are coupled to read pads on the surface of the slider; leads are wire-bonded to these read pads and coupled to read signal processing circuitry of the disk drive. Remaining conventional elements of the magnetic head shown in FIG. 17 include a P1 pedestal 1702 and a P1 back gap pedestal 1704 formed on first pole piece layer 1502, a second pole piece (P2) which includes a P2 pole 1706 and a P2 back gap 1708, a gap layer 1710 which separates the first and the second pole pieces at the ABS, a connecting yoke 1712, and write coils 1714 (beneath connecting yoke 1712 as well as behind the pole pieces). PN pedestal 1702, P1 back gap pedestal 1704, P2 pole 1706, P2 back gap 1708, and connecting yoke 1712 are made of magnetic materials, whereas gap layer 1710 is made of an insulator such as alumina.

The additional connecting layers and the remaining write head components are also made of or include magnetic materials. Preferably, these magnetic materials are suitable write head materials and include high moment materials. For example, these elements may be made of an alloy of $Ni_{45}Fe_{55}$, or other suitable alloys of NiFe, CoFe, or CoNiFe. The components are preferably made from the same magnetic material (e.g. $Ni_{45}Fe_{55}$) and are simultaneously formed in the same processing step (e.g. a photolithography step).

As described, the connecting necks are made sufficiently small and/or narrow to magnetically uncouple the shields from the connecting columns. Advantageously, the influence of the connecting columns on the magnetic properties of the shields is eliminated or substantially reduced while the electrical connections for the tunnel valve sensor are still provided.

Figure 18:
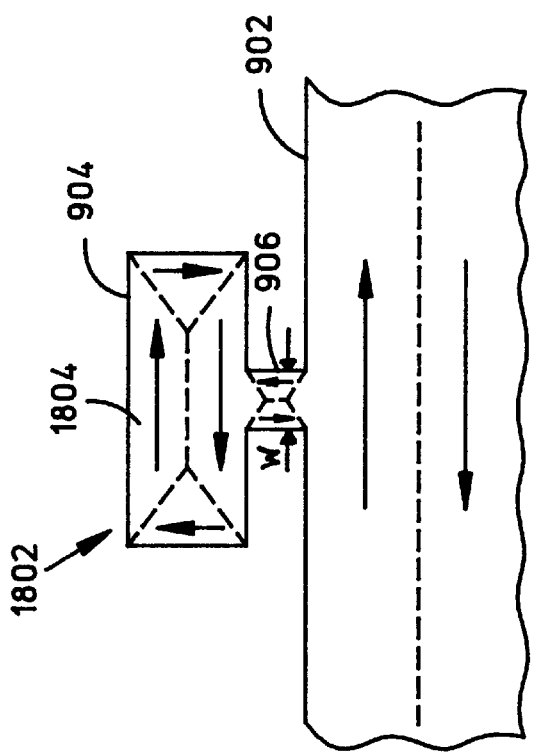
FIG. 18 is a top down view of a shield and a connecting column layer, which further shows the magnetic domains of the shield, the connecting column layer, and the connecting neck layer.

To further illustrate, FIG. 18 shows a close-up top down view of a portion of shield 902 and connecting layer 904 for the first shield connection. This figure and corresponding description is also representative of the second shield and connecting layer for the second shield connection. A plurality of magnetic domains 1802 (such as a magnetic domain 1804) are shown within magnetic domain walls which are represented by dashed lines. The top and bottom magnetic domains for connecting layer 904 are shown as trapezoidal shapes whereas the left and right magnetic domains are shown as triangular shapes. For connecting neck layer 906, the left and right magnetic domains are shown as trapezoidal shapes. The arrows shown in FIG. 18 represent the magnetic orientation within each magnetic domain. The magnetic domains in connecting layer 904 can be strongly influenced by the magnetic write head material used in the connecting column. The undesirable magnetic domain wall motion in shield 902 can affect the stability of the read sensor. However, connecting neck layer 906 restricts the magnetic domain wall movement from entering into shield 902 (see notation of width W of connecting neck layer 906). Thus, shield 902 is magnetically uncoupled from the connecting column and is made magnetically stable in accordance with the present invention.

An alternate embodiment of a magnetic head having inventive shield connections now will be described in relation to FIGS. 1–3. Magnetic head 100 includes first shield layer 102 and second shield layer 104 which are made of a magnetic material. Tunnel valve sensor 106 is coupled to and sandwiched in between first and second shield layers 102 and 104. Other elements of the magnetic head shown in FIG. 3 include first pole piece (P1) layer 108, P1 pedestal 306, P1 back gap pedestal 318, second pole piece (P2) which includes P2 pole 310 and P2 back gap 316, gap layer 310 which separates the first and the second pole pieces at the ABS, connecting yoke 312, and write coils 314. First pole piece layer 108, P1 pedestal 306, P1 back gap pedestal 318, P2 pole 310, P2 back gap 316, and connecting yoke 312 are made of magnetic materials, whereas gap layer 310 is made of an insulator.

First connecting pedestal 110 helps provide a first connection for read sensor 106 from first shield layer 102, whereas second connecting pedestal 112 helps provide a second connection for read sensor 106 from second shield layer 104. Also, first connecting pedestal 110 is formed over first shield layer 102 (here, along its back edge). Similarly, second connecting pedestal 112 is formed over second shield layer 104 (here, along its back edge). Connecting pedestals 110 and 112 are extended upwards (FIG. 3) to form connecting columns. These connecting columns are coupled to read pads on the surface of the slider; leads are wire-bonded to these read pads and coupled to read signal processing circuitry of the disk drive.

In this alternate embodiment, the connecting columns are each made of non-magnetic electrically conductive materials, such as copper. This is in contrast to first pole piece layer 108, P1 pedestal 306, P1 back gap pedestal 318, P2 pole 310, P2 back gap 316, and connecting yoke 312, which are made of magnetic materials (and preferably the same magnetic material). Preferably, the connecting columns are made of the same non-magnetic electrically conductive materials. Thus, the magnetic connection between each shield and connecting column is eliminated or reduced while the electrical connection for the tunnel valve sensor is still provided.

Figure 2:
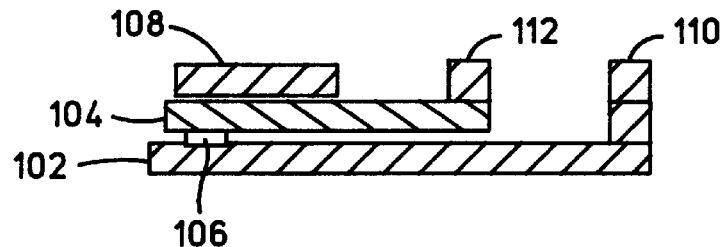
FIG. 2 is a cross-sectional view of the partially constructed magnetic head of FIG. 1, which also shows the shield connections for the tunnel valve sensor.
Figure 3:
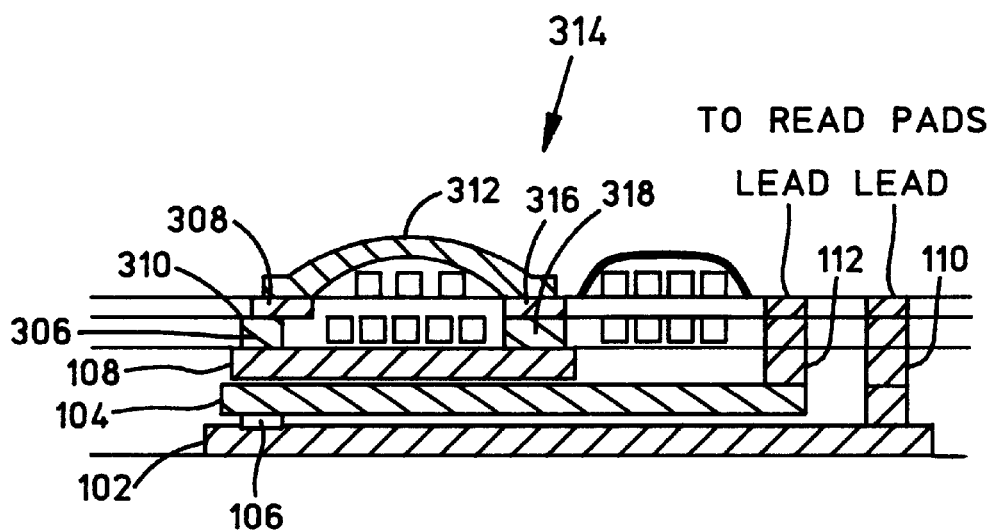
FIG. 3 is another cross-sectional view of the magnetic head of FIGS. 1–2, which is shown in a more fully constructed form.

As a variation to the embodiment just described in relation to FIGS. 1–3, each non-magnetic electrically connecting column is offset from its corresponding shield as illustrated in relation to FIGS. 15–17. That is, in the magnetic head structure illustrated in FIGS. 15–17, the first and the second shields are made from magnetic materials while the first and the second connecting columns are made from non-magnetic electrically conductive materials.

Figure 21:
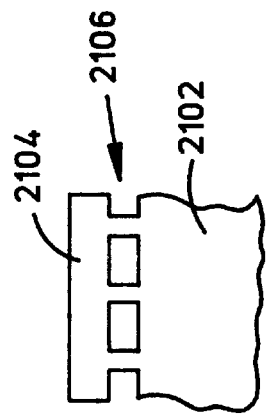
FIG. 21 is yet another alternative shape (e.g. a narrower rectangle) for the connecting column, where a plurality of narrow connecting necks are used to couple the shield to the connecting column layer.
Figure 20:
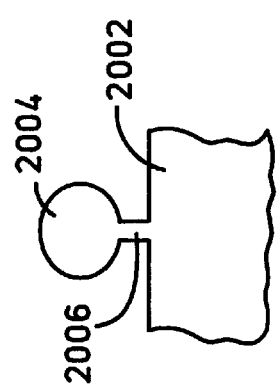
FIG. 20 is a top down view of another alternative shape (e.g. a circle or oval) for the connecting column.
Figure 19:
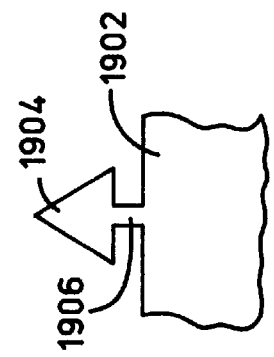
FIG. 19 is a top down view of an alternative shape (e.g. a triangle) for the connecting column.

In all of the embodiments described, the cross-sectional shapes of the connecting columns have been shown to be rectangular. However, any suitable shape and/or arrangement within the scope of the present invention may be utilized. FIGS. 19–21 show a few variations on the possible cross-sectional shapes and arrangements for the connecting columns. More particularly, FIG. 19 shows a shield 1902 and a connecting column 1904 which has a triangular cross-sectional shape and is connected to shield 1902 via a connecting neck 1906. As another example, FIG. 20 shows a shield 2002 and a connecting column 2004 which has a circular or oval cross-sectional shape and is connected to shield 2002 via a connecting neck 2006. FIG. 21 shows a shield 2102 and a connecting column 2104 which has a narrow rectangular cross-sectional shape and is connected to shield 2102 via a plurality of connecting necks 2106. In each of these cases, the connecting columns are offset from the shield and connected to the shield by one or more connecting necks. Although each connecting neck and its associated column have been shown to have widths that are different from each other, the widths of these structures may be similar or substantially the same.

As described herein, the magnetic head of the present invention includes a tunnel valve sensor; a first shield coupled to a first end of the tunnel valve sensor; and a second shield coupled to a second end of the tunnel valve sensor. A first connecting column of the magnetic head electrically couples the first shield to a first read pad, and a second connecting column of the magnetic head electrically couples the second shield to a second read pad. Advantageously, the first connecting column is magnetically uncoupled from the first shield and the second connecting column is magnetically uncoupled from the second shield. This eliminates or substantially reduces the influence of the connecting columns on the magnetic properties of the shields. In one embodiment, the first connecting column is offset from the first shield and is coupled to it through a first connecting neck, and the second connecting column is offset from the second shield and is coupled to it through a second connecting neck. Preferably, the first and second connecting columns are made of the same conductive magnetic material as the first and the second pole pieces. In an alternate embodiment, the first and the second shields are made of a magnetic material whereas the first and the second connecting columns are made of a non-magnetic electrically conductive material. Here, the first and the second connecting columns may be formed over the shields or be offset from the shields and coupled thereto via connecting necks.

Thus, the influence of the connecting columns on the magnetic properties of the shields is eliminated or substantially reduced while the electrical connections for the tunnel valve sensor are provided. It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
    a tunnel valve sensor;
    a shield coupled to the tunnel valve sensor;
    a connecting column which couples the shield to a read pad, the connecting column being:
        offset from the shield;
        coupled to the shield through a connecting neck; and
        magnetically uncoupled from the shield.

2. The magnetic head of claim 1, wherein the connecting column is made from a magnetic material.

3. The magnetic head of claim 1, further comprising:
    first and second pole pieces;
    the first and second pole pieces being made of a magnetic material; and
    at least a portion of the connecting column being made from the same magnetic material as the first and second pole pieces.

4. The magnetic head of claim 1, wherein the connecting neck is made sufficiently narrow such that the connecting column is magnetically uncoupled from the shield.

5. The magnetic head of claim 1, wherein the connecting neck has a width that is at least four times less than a width of the shield.

6. The magnetic head of claim 1, wherein the shield comprises a first shield, the connecting column comprises a first connecting column, the read pad comprises a first read pad, and the connecting neck comprises a first connecting neck, the magnetic head further comprising:
    a second shield coupled to the tunnel valve sensor
    a second connecting column which couples the second shield to a second read pad, the second connecting column being:
        offset from the second shield;
        coupled to the second shield through a second connecting neck; and
        magnetically uncoupled from the second shield.

7. A magnetic recording device, comprising:
    at least one rotatable magnetic disk;
    a spindle which supports the at least one rotatable magnetic disk;
    a disk drive motor which rotates the at least one rotatable magnetic disk;
    a magnetic head for use with the at least one rotatable magnetic disk;
    a slider which supports the magnetic head;
    the magnetic head including:
        a tunnel valve sensor;
        a shield coupled to the tunnel valve sensor;
        a connecting column which couples the shield to a read pad, the connecting column being:
            offset from the shield;
            coupled to the shield through a connecting neck; and
            magnetically uncoupled from the shield.

8. The magnetic recording device of claim 7, wherein the connecting column is made from a magnetic material.

9. The magnetic recording device of claim 7, the magnetic head further comprising:

first and second pole pieces;
the first and second pole pieces being comprising a magnetic material; and
at least a portion of the connecting column comprising the same magnetic material as the first and second pole pieces.

10. The magnetic recording device of claim 7, wherein the connecting neck is made sufficiently narrow such that the connecting column is magnetically uncoupled from the shield.

11. The magnetic recording device of claim 7, wherein the connecting neck has a width that is at least four times less than a width of the shield.

12. The magnetic recording device of claim 7, wherein the shield comprises a first shield, the connecting column comprises a first connecting column, the read pad comprises a first read pad, and the connecting neck comprises a first connecting neck, the magnetic head further comprising:
a second shield coupled to the tunnel valve sensor;
a second connecting column which couples the second shield to a second read pad, the second connecting column being:
offset from the second shield;
coupled to the second shield through a second connecting neck; and
magnetically uncoupled from the second shield.

13. A magnetic head, comprising:
a tunnel valve sensor;
a shield coupled to the tunnel valve sensor;
a connecting column which couples the shield to a read pad;
the shield comprising a magnetic material; and
the connecting column comprising a non-magnetic electrically conductive material.

14. The magnetic head of claim 13, wherein the connecting column is formed over the shield.

15. The magnetic head of claim 13, wherein the connecting column comprises copper.

16. The magnetic head of claim 13, wherein the shield comprises a magnetic material and the connecting column is non-magnetic.

17. The magnetic head of claim 13, wherein the shield comprises a first shield, the connecting column comprises a first connecting column, and the read pad comprises a first read pad, the magnetic head further comprising:
a second shield coupled to the tunnel valve sensor;
a second connecting column which couples the second shield to a second read pad; and
the second connecting column comprising a non-magnetic material.

18. A magnetic recording device, comprising:
at least one rotatable magnetic disk;
a spindle which supports the at least one rotatable magnetic disk;
a disk drive motor which rotates the at least one rotatable magnetic disk;
a magnetic head for use with the at least one rotatable magnetic disk;
a slider which supports the magnetic head;
the magnetic head including:
a tunnel valve sensor;
a shield coupled to the tunnel valve sensor;
a connecting column which couples the shield to a read pad; and
the connecting column comprising a non-magnetic electrically conductive material.

19. The magnetic recording device of claim 18, wherein the connecting column is made from a magnetic material.

20. The magnetic recording device of claim 18, wherein the shield comprises a magnetic material.

21. The magnetic recording device of claim 18, wherein the shield comprises a first shield, the connecting column comprises a first connecting column, the read pad comprises a first read pad, and the connecting neck comprises a first connecting neck, the magnetic head further comprising:
a second shield coupled to the tunnel valve sensor;
a second connecting column which couples the second shield to a second read pad; and
the second connecting column comprising a non-magnetic material.

22. A magnetic head, comprising:
a tunnel valve sensor;
a first shield coupled to a first end of the tunnel valve sensor;
a second shield coupled to a second end of the tunnel valve sensor;
a first connecting column which electrically couples the shield to a read pad;
a second connecting column which electrically couples the second shield to a second read pad;
the first connecting column being magnetically uncoupled from the first shield; and
the second connecting column being magnetically uncoupled from the second shield.

23. The magnetic head of claim 22, further comprising:
wherein the first connecting column is:
offset from the first shield; and
coupled to the first shield through a first connecting neck;
wherein the second connecting column is:
offset from the second shield; and
coupled to the second shield through a second connecting neck.

24. The magnetic head of claim 22, further comprising:
wherein the first shield comprises a magnetic material;
wherein the second shield comprises a magnetic material;
wherein the first connecting column comprises a non-magnetic electrically conductive material; and
wherein the second connecting column comprises a non-magnetic electrically conductive material.

25. The magnetic head of claim 22, further comprising:
wherein the first and the second shields comprise the same magnetic material; and
wherein the first and the second connecting columns comprise the same non-magnetic electrically conductive material.

* * * * *